United States Patent
Howe (10) Patent No.: US 7,444,753 B1
(45) Date of Patent: Nov. 4, 2008

(54) CAMBER/CASTER GAUGE

(75) Inventor: Chas Howe, Beaverton, MI (US)

(73) Assignee: Howe Racing Enterprises, Beaverton, MI (US)

( * ) Notice: Subject to any disclaimer, the term of this patent is extended or adjusted under 35 U.S.C. 154(b) by 28 days.

(21) Appl. No.: 11/789,046

(22) Filed: Apr. 23, 2007

Related U.S. Application Data (60) Provisional application No. 60/873,672, filed on Dec. 6, 2006.

(51) Int. Cl.
*G01B 13/195* (2006.01)
*G01B 5/255* (2006.01)

(52) U.S. Cl. .................................. 33/203.18; 33/337

(58) Field of Classification Search ............. 33/203.19, 33/203.18, 203.2, 337
See application file for complete search history.

(56) References Cited

U.S. PATENT DOCUMENTS

| | | | |
|---|---|---|---|
| 2,729,896 A * | 1/1956 | Rosenblum | 33/337 |
| 2,831,265 A * | 4/1958 | Weaver | 33/203.18 |
| 3,250,015 A * | 5/1966 | Piper | 33/337 |
| 3,520,064 A * | 7/1970 | Kushmuk | 33/337 |
| 4,114,283 A * | 9/1978 | Spainhour et al. | 33/337 |
| 4,546,548 A * | 10/1985 | Bullock, Sr. | 33/203.18 |
| 4,771,546 A * | 9/1988 | Cavazos | 33/203.18 |
| 5,168,632 A | 12/1992 | Rimlinger | |
| 5,257,458 A * | 11/1993 | Koerner | 33/203.18 |
| 6,507,988 B1 | 1/2003 | Riviere | |
| 7,185,438 B2 * | 3/2007 | Paulsen et al. | 33/203.18 |

* cited by examiner

*Primary Examiner*—Christopher W Fulton
(74) *Attorney, Agent, or Firm*—Robert L. McKellar; McKellar IP Law, PLLC (57) ABSTRACT

A camber/caster gauge that is attachable to the axle of a wheeled vehicle. The device is simple to use by attaching the gauge to an automobile axle end and zeroing out the measurement dials.

8 Claims, 9 Drawing Sheets

CAMBER/CASTER GAUGE

This application claims priority from U.S. Provisional Patent Application 60/873,672 filed Dec. 6, 2006.

The present invention deals with a device that is capable of measuring the camber and caster of a wheeled vehicle.

BACKGROUND OF INVENTION

Camber refers to the angle between the plane of a wheel's circumference and a vertical line, measured in degrees and minutes. When the top of a wheel tilts inward, the camber is negative, and when it is tilted outward the camber is positive. Caster refers to the angle between the vehicle's steering axis and a vertical line, as viewed from the side of the wheel. The measurement is in degrees and minutes. Devices to measure and help assist in measuring and setting camber and caster are not new to the art.

U.S. Pat. No. 5,168,632 issued Dec. 8, 1992 to Rimlinger, describes an automotive wheel alignment method and apparatus that has three indicators and a gauge element. This device requires multiple steps to measure and then manipulate the alignment to reach the appropriate level of alignment. The instant device allows the measurement to be taken and then the proper adjustments can be made with the device in constant contact with the vehicle.

U.S. Pat. No. 6,507,988 issued on Jan. 21, 2003 to Riviere discloses a device that attaches to the lugs of the wheel hub and not to the axle, limiting its accuracy.

THE INVENTION

What is disclosed and claimed herein is a gauge for measuring the camber and caster of a wheeled vehicle comprising in combination, a receiving end, a straight vial level, a camber measurement dial and a caster measurement dial and a housing. The receiving end has a near end and a distal end. The near end is capable of receiving an axle end and the distal end is connected to the housing.

The housing has a first side and a second side. The first side has a top surface. This top surface has a straight level vial mounted within it. This vial is mounted to a pivotal internal shaft and the internal shaft has a geared portion that is spring loaded.

The geared portion of the internal shaft is appropriately aligned with a vertical worm gear. The worm gear is mounted to a drive shaft and the drive shaft is internally connected to the worm gear. The drive shaft is driven by the camber measurement dial. The caster measurement dial is independently rotatable from the camber measurement dial.

DETAILED DESCRIPTION OF THE DRAWINGS

Figure 1:
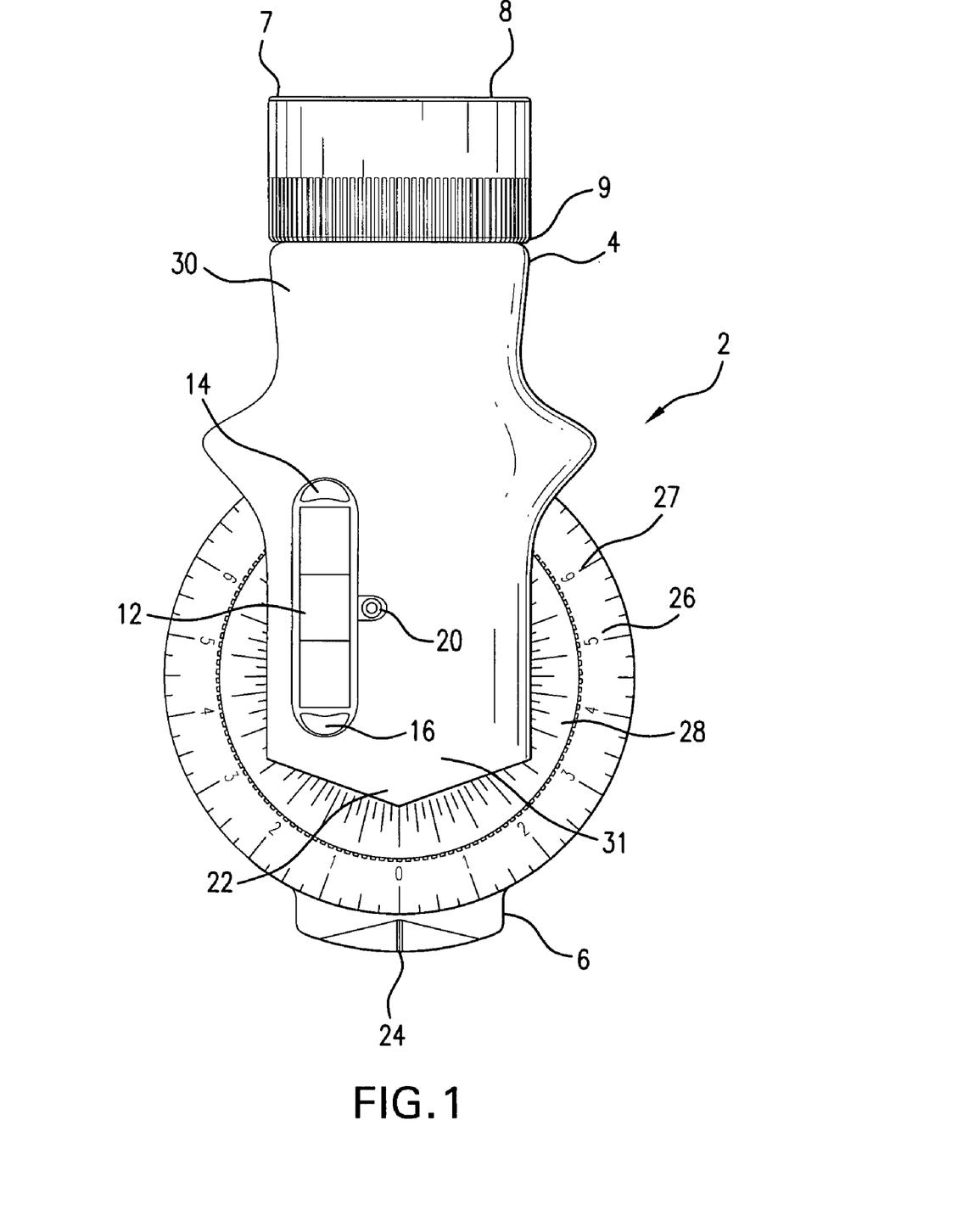
FIG. 1 is a full top view of the camber/caster gauge.

FIG. 1 is a full top view of the camber/caster gauge 2 showing the near end 4 and the distal end 6. The near end 4 is attached to a threaded adaptor 8. The threaded adaptor 8 has a near end 7 and a distal end 9. The threaded adaptor 8 is attached to the near end 4 of the camber/caster gauge 2 at its distal end 9 via the adaptor connector 18, (not shown). The near end 7 of the threaded adaptor 8 is the end that attaches the caster/camber gauge to the axle of a wheeled vehicle. In this figure the straight vial level 12 is shown. The straight vial level 12 is mounted within a top housing 30. The straight vial level 12 has a near end 14 and a distal end 16. Also shown in this Figure is the attachment point 20 of the straight vial level 12, to the pivotal shaft 54 (not shown). The camber measurement (large dial) 26 is shown wherein the graduation 27 of the camber dial 26 that is measured in degrees and minutes. The camber dial 26 graduation scale ranges from 0° to −/+90. The distal end 6 of the camber/caster gauge 2 has a zero mark 24. Also shown is the caster measurement (small dial) 28 with the graduation 27. The caster dial 28 has a scale that ranges from 0° to 13°−/+. Distal end 31 of the top housing 30 has a zero mark 22 for the caster dial 28.

Figure 2:
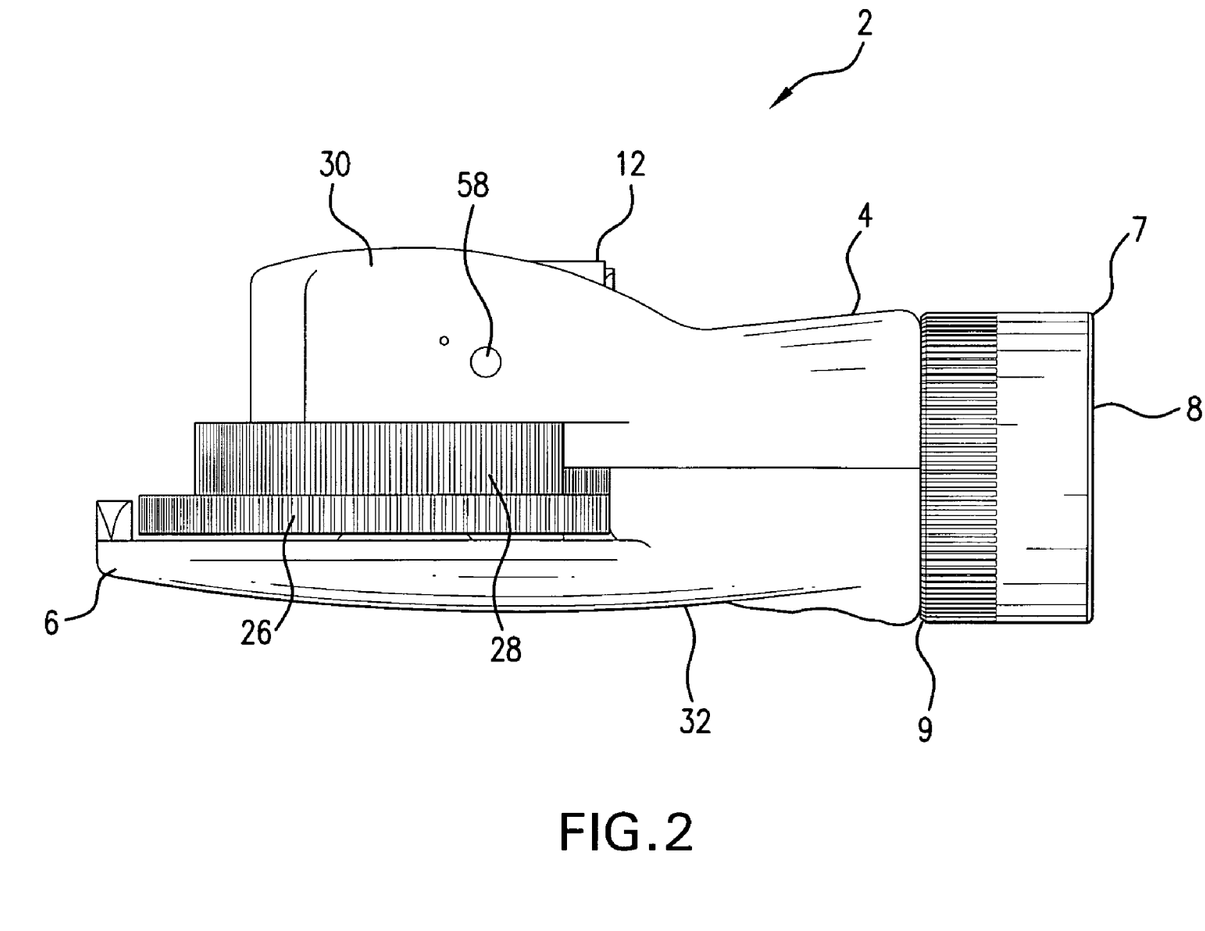
FIG. 2 is a full side view of the camber/caster gauge.

FIG. 2 is a full side view of the camber/caster gauge 2. This Figure allows the near end 4 and the distal end 6 to be viewed more clearly. The top housing 30 and the bottom housing 32 are clearly shown. This Figure shows a better side view of the camber dial 26 and caster dial 28. The straight vial level 12 is shown and it shows good reference for the distal end 58 of the level pivotal shaft 54. The threaded adaptor 8 is clearly shown with its near end 7 and its distal end 9.

Figure 3:
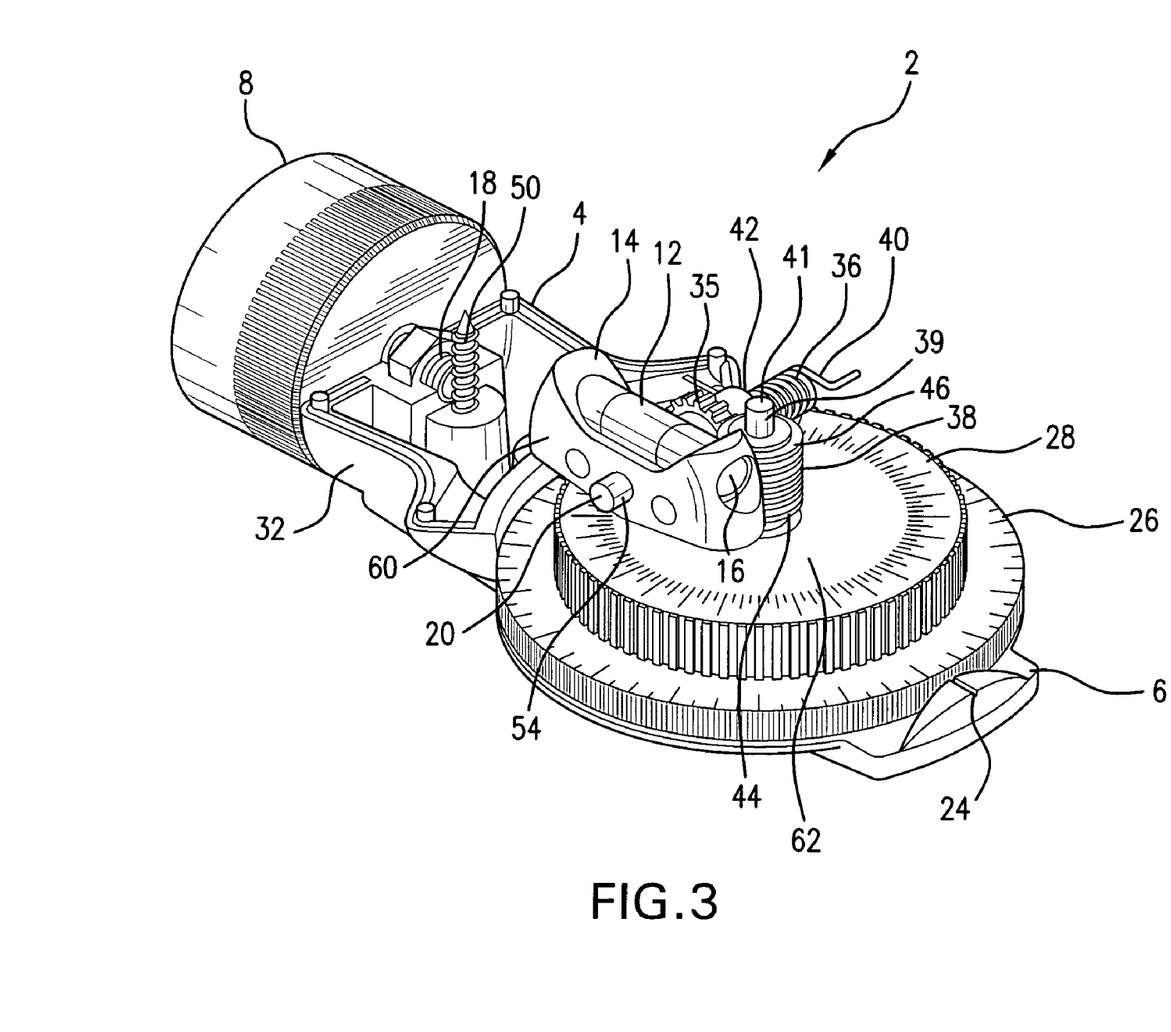
FIG. 3 is an internal perspective view of the camber/caster gauge.

FIG. 3 is an internal perspective view of the camber/caster gauge 2. Many of the components from the first two Figures are represented by like numbers. The camber/caster gauge 2, with its near end 4 and its distal end 6 are shown. The threaded adaptor 8 is shown with its connector 18. In this embodiment the adapter connector 18 is threaded allowing the threaded adaptor 8 to be interchangeable to accommodate all wheeled vehicle makes and models, whether domestic or foreign. The threaded adaptor 8 is unfastened, and another adaptor is connected, allowing for rapid interchangeability.

The bottom housing 32 supports the camber dial 26 and the caster dial 28. These dials are rotatable within the confines of the bottom housing 32. Also incorporated into the bottom housing 32 is the camber dial 26, zero mark 24. Also present is the straight vial level 12. The straight vial level 12 is pivotally mounted on the level pivoting shaft 54. The straight vial level 12 has a near end 14 and a distal end 16. The straight vial level is incorporated into a housing 60. This housing has an opening 20 that accommodates the straight vial level pivoting shaft 54.

The large camber dial 26 has a shaft 39 internally mounted to it and the shaft 39 is internal to the small caster dial 28, but independent thereof of the small caster dial 28, therefore, it is capable of moving independently of the camber dial 26 on the internal shaft 39. The shaft 39 extends beyond the top surface 62 of the small caster dial 28. The portion of the shaft 39 that extends beyond the top surface 62 of the small caster dial has a vertical worm gear 38 mounted to it. The vertical worm gear 38 has a near end 44 just above the top surface 62 of the small caster dial 28. The distal end 46 of vertical worm gear 38 terminates just below the distal end 41 of the shaft 39.

The straight vial level pivotal shaft 54 has a gear 35 mounted to it. This gear 35 is interconnected to the vertical worm gear 38. Extending beyond the gear 38 is a spring 36. This spring 36 has a near end 40 and a distal end 42. Another component shown in this view is the fastener 50 that connects the bottom housing 32 with the top housing 30 (not shown).

Figure 4:
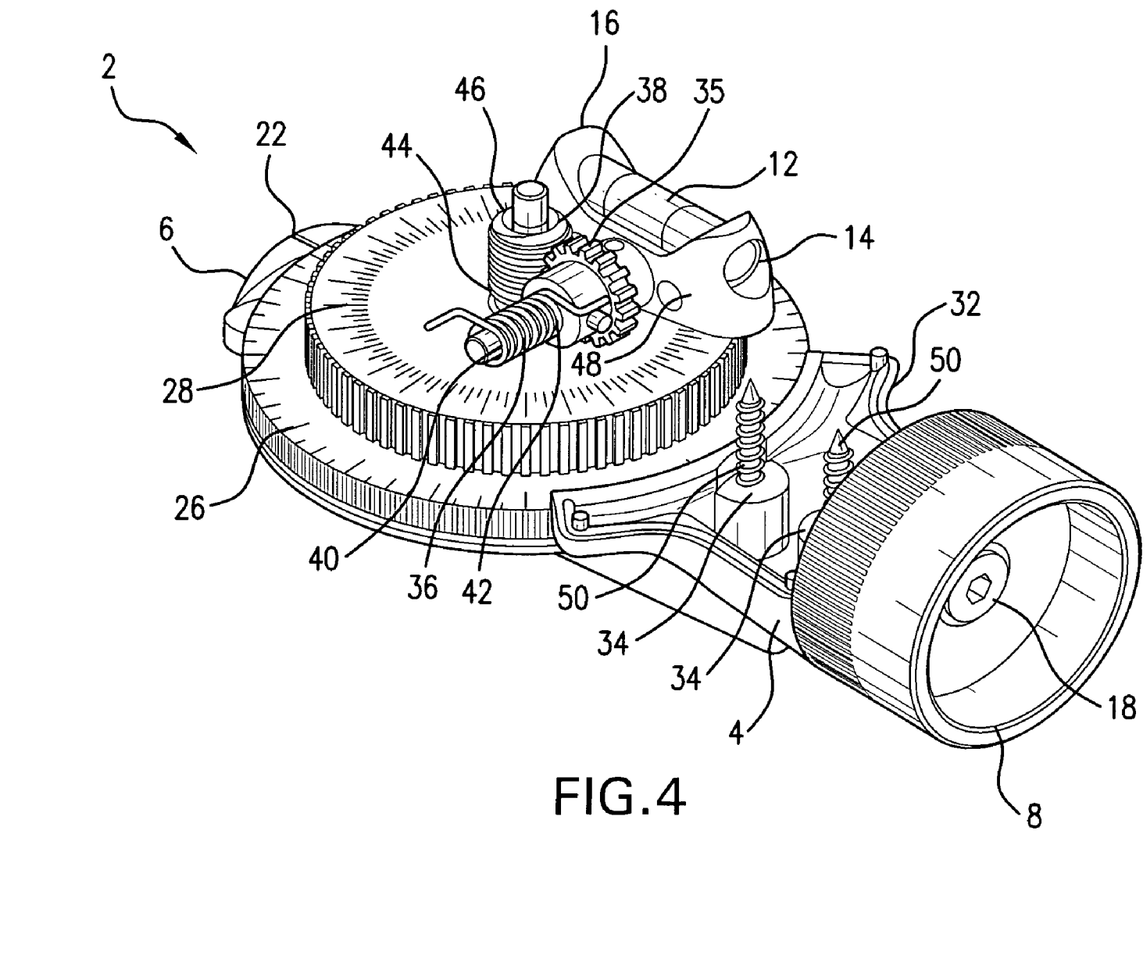
FIG. 4 is a reverse internal perspective of the camber/caster gauge.

FIG. 4 is a reverse internal perspective of the camber/caster gauge 2. This Figure shows the opposite view of FIG. 3. It gives a better perspective of the interaction of the vertical worm gear 38 and the gear 35. The vertical worm gear 38 has a near end 44 and a distal end 46. Also shown is the spring 36, the purpose of this spring 36 is to place pressure upon the straight vial level 12. This spring 36 has a near end 40 and a distal end 42. Even more components are the straight vial level 12, the near end 14 and the distal end 16. There is also a first side 48 of the straight vial level 12. The level pivot shaft 54 connects to the straight vial level 12. The large dial 26 and the small dial 28 are set within the bottom housing 32 of camber/caster gauge 2. At the distal end 33 of the bottom housing 32 of camber/caster gauge 2 is the zero mark 22 for the large dial 26. The near end 4 of the camber/caster gauge 2 is the threaded adaptor 8. Within this adaptor is the adaptor connector 18. The connector 18 can be of many different forms such as a set screw, torch screw, or any fastening means that uses a treaded shaft and a head as a driving means. There are at least two openings 34 through the bottom housing 32 utilizing fasteners 50 that connect the bottom housing 32 and the top housing 30 (not shown here).

Figure 5:
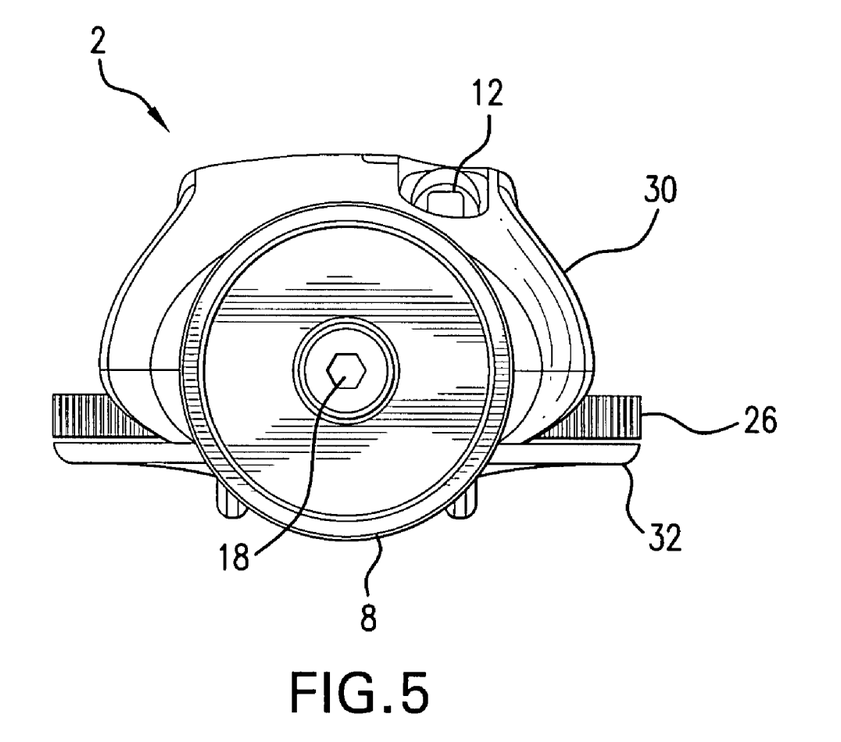
FIG. 5 is a full end view showing a threaded adaptor of the camber/caster gauge.

FIG. 5 is a full end view featuring a threaded adaptor 8 of the camber/caster gauge 2. This Figure shows the adaptor connector 18 of the threaded adaptor 8 as well as the relationship between the bottom housing 32 and the large dial 26. It is also clear that the straight vial level 12 sits within the top housing 30.

Figure 6:
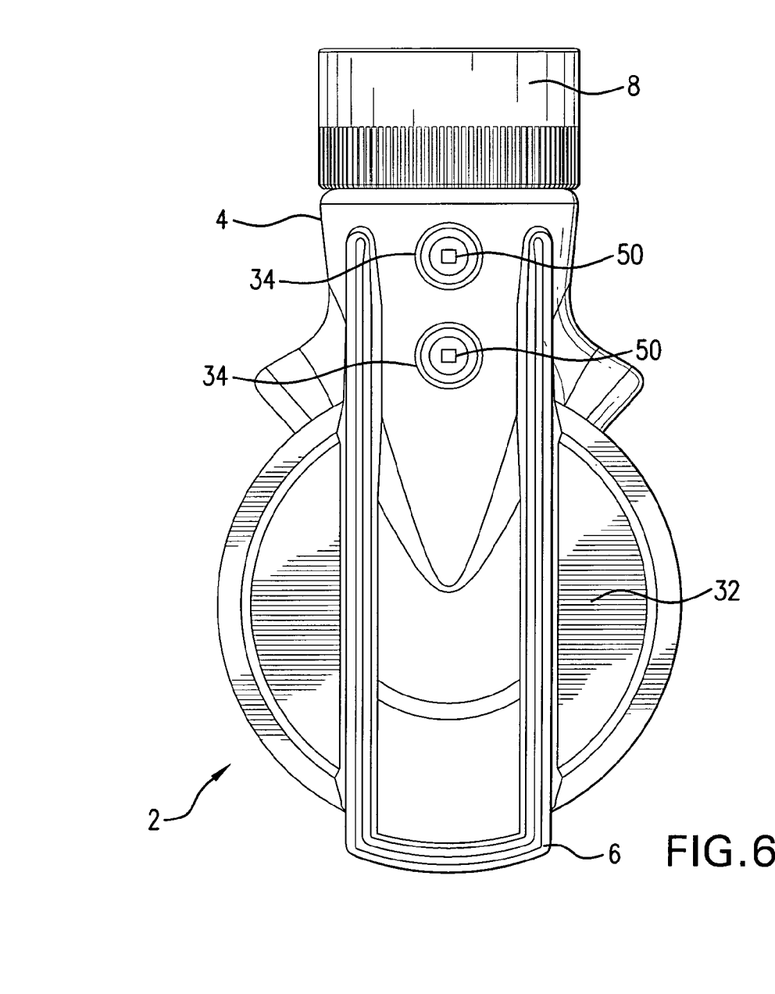
FIG. 6 is a full bottom view of the camber/caster gauge.

FIG. 6 is a full bottom view of the camber/caster gauge 2. The Figure shows the bottom housing 32, the distal end 6 of the camber/caster gauge 2, and the near end 4. The near end 4 has the threaded adaptor 8 connected to it. The bottom housing 32 is connected to the top housing 30 (not shown) via the fasteners 50 through the openings 34 in the bottom housing 32.

Figure 7:
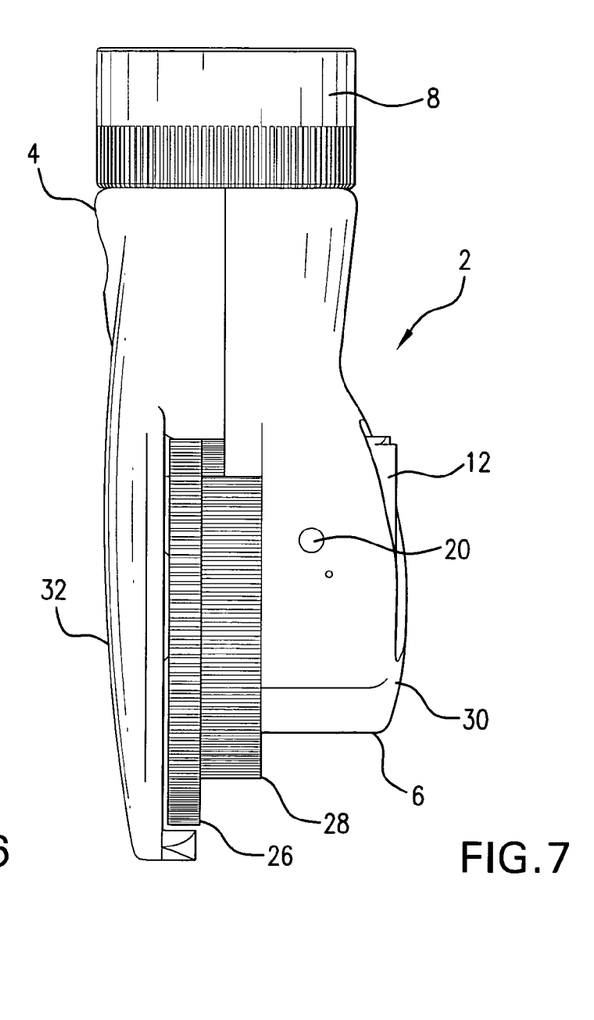
FIG. 7 is a full side view of the camber/caster gauge.

FIG. 7 is a full side view of the camber/caster gauge 2. Again this Figure shows the various components of the camber/caster gauge 2, the near end 4 and the distal end 6. The threaded adaptor 8 is attached to the near end 4 via the adaptor connector 18 (not shown). Within the top housing 30 is located the straight vial level 12 and also showing the near end 20 of the level pivotal shaft 54. Also shown is the large dial 26 and the small dial 28 located on the bottom housing 32.

Figure 8:
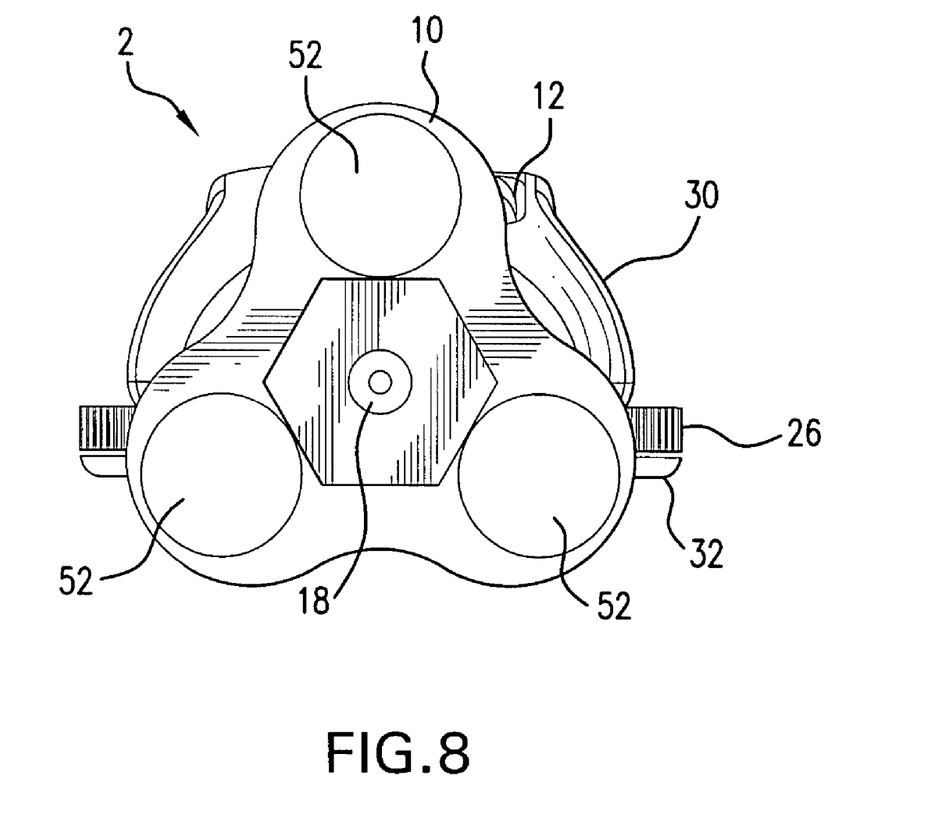
FIG. 8 is an end view showing the magnetic adaptor of the camber/caster gauge.

FIG. 8 is an end view featuring the magnetic adaptor 10 of the camber/caster gauge 2. This perspective shows the adaptor connector 18 of the magnetic adaptor 10 as well as the relationship between the bottom housing 32 and the large dial 26. It also clearly shows the straight vial level 12 sitting within the top housing 30. Mounted within the magnetic adaptor 10 are magnets 52. The purpose of the magnetic adaptor 10 is the ability to quickly test the camber/caster without having to turn on a threaded adaptor 8. This proves critical in racing situations.

Figure 9:
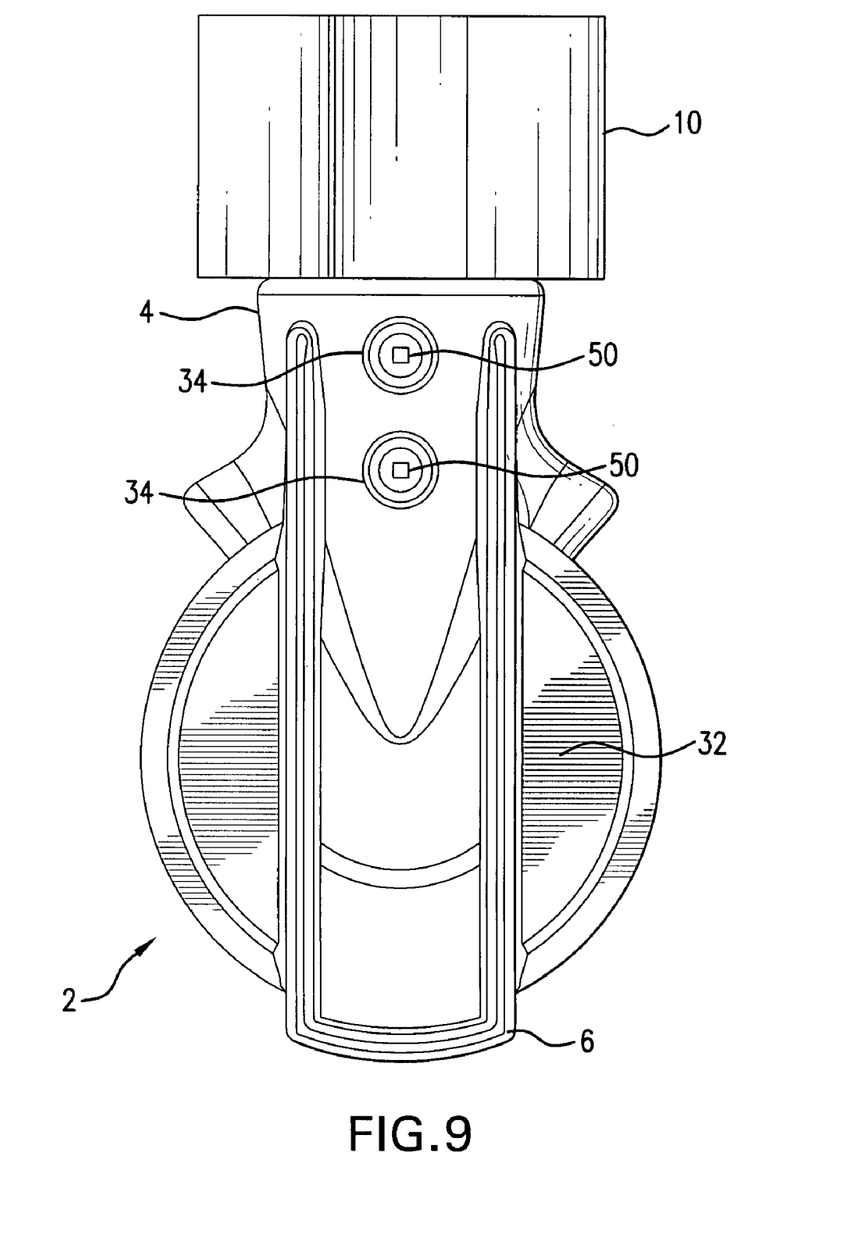
FIG. 9 is a full bottom view showing the magnetic adaptor of the camber/caste gauge.

FIG. 9 is a full bottom view featuring the magnetic adaptor 10 of the camber/caster gauge 2. The perspective shows the bottom housing 32 the distal end 6 of the camber/caster gauge 2 and the near end 4. The near end 4 has the magnetic adaptor 10 connected to it. The bottom housing 32 is connected to the top housing 30 (not shown) via the fasteners 50 through the openings 34 of the bottom housing 32.

Figure 10:
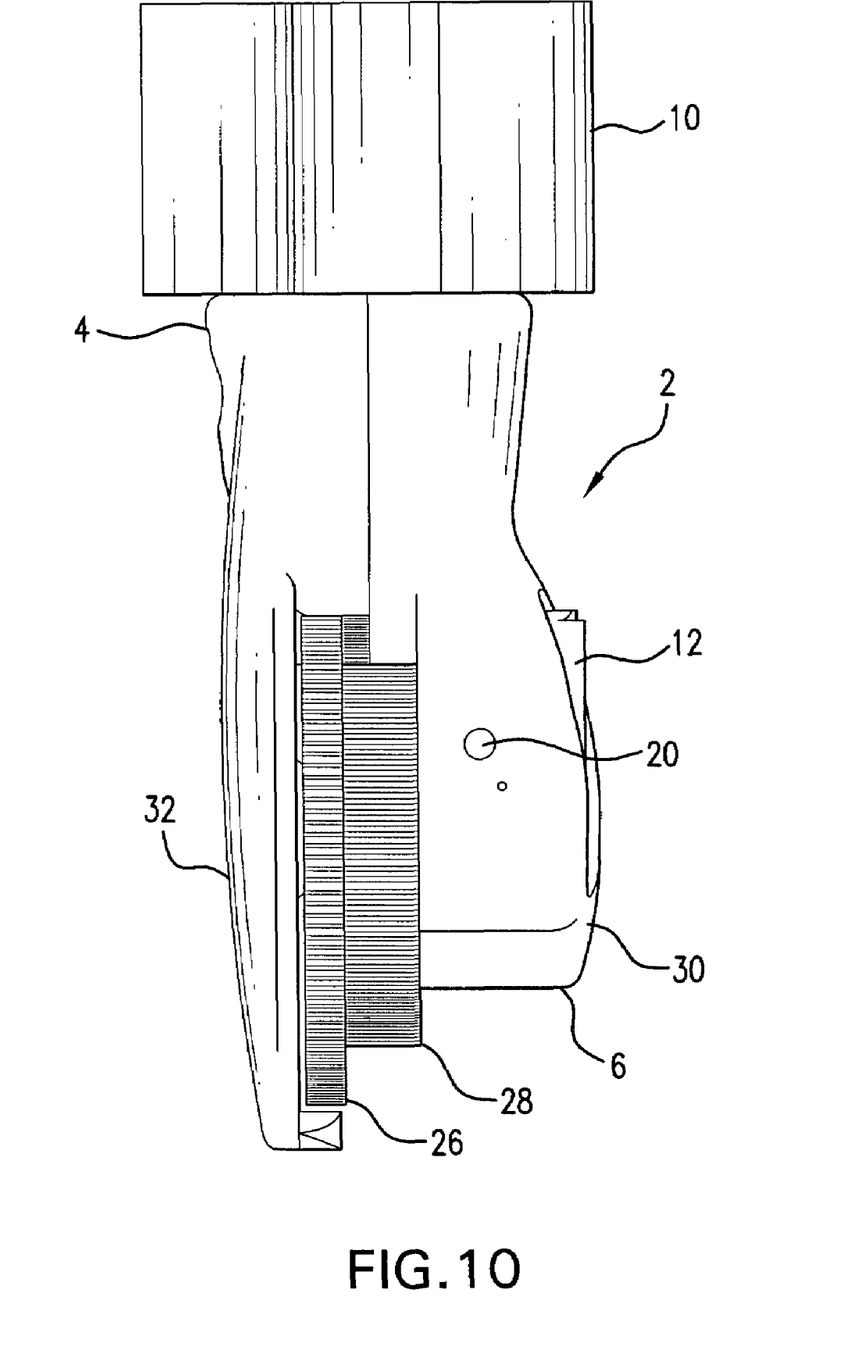
FIG. 10 is a full side view showing the magnetic adaptor of the camber/caster gauge.

FIG. 10 is a full side view showing the magnetic adaptor 10 of the camber/caster gauge 2. This Figure shows the various components of the camber/caster gauge 2. The near end 4 and the distal end 6. The magnetic adaptor 10 is attached to the near end 4 via the adaptor connector 18 (not shown). Located within the top housing 30 is the straight vial level 12 and the near end 20 of the level pivotal shaft 54. Also shown is the large dial 26 and the small dial 28 located on the bottom housing 32.

The adaptors are manufactured of fit all makes and models of automobiles manufactured whether they are foreign or domestic. The material of manufacture of these adaptors is preferred to be aluminum however; they can be manufactured from other metals, liquid metals, composite plastics, plastics, graphite, composite graphite, and the like.

What is claimed is:

1. A gauge for measuring the camber and caster of a wheeled vehicle comprising in combination, a receiving end, a straight vial level, a camber measurement dial, a caster measurement dial, a worm gear and a housing;

said receiving end having a near end and a distal end, said near end being capable of receiving and attaching to an axle end, the distal end being connected to the housing, said housing having a first side and a second side, said first side having a top surface, said top surface having a straight level vial mounted on it, said vial being mounted to a pivotal internal shaft, said pivotal internal shaft having a geared portion and being spring loaded;

said geared portion of said pivotal internal shaft being aligned with a vertical worm gear, said worm gear being mounted and connected to a drive shaft, said drive shaft being driven by said camber measurement dial, said caster measurement dial being independently rotatable with the rotation of said camber measurement dial.

2. A Camber/Caster gauge as claimed in claim 1 wherein said receiving end is magnetic.

3. A Camber/Caster gauge as claimed in claim 1 wherein said receiving end is metal.

4. A Camber/Caster gauge as claimed in claim 1 wherein said receiving end is manufactured to fit various models of automobiles.

5. A Camber/Caster gauge as claimed in claim 1 wherein said receiving end is threaded.

6. A Camber/Caster gauge as claimed in claim 1 wherein camber measurement dial is graduated in degrees and minutes.

7. A Camber/Caster gauge as claimed in claim 1 wherein said caster measurement dial is graduated in degrees and minutes.

8. A Camber/Caster gauge as claimed in claim 3 wherein said receiving end is manufactured from aluminum.

* * * * *